United States Patent
Cizas et al.

(10) Patent No.: US 9,602,290 B2
(45) Date of Patent: Mar. 21, 2017

(54) SYSTEM AND METHOD FOR VEHICLE MESSAGING USING A PUBLIC KEY INFRASTRUCTURE

(71) Applicant: Infineon Technologies AG, Neubiberg OT (DE)

(72) Inventors: Jurijus Cizas, Fremont, CA (US); Mark Stafford, Morgan Hill, CA (US)

(73) Assignee: Infineon Technologies AG, Neubiberg (DE)

( * ) Notice: Subject to any disclaimer, the term of this patent is extended or adjusted under 35 U.S.C. 154(b) by 1 day.

(21) Appl. No.: 14/516,385

(22) Filed: Oct. 16, 2014

(65) Prior Publication Data

US 2016/0112206 A1  Apr. 21, 2016

(51) Int. Cl.
*H04L 29/06* (2006.01)
*G06F 21/00* (2013.01)
(Continued)

(52) U.S. Cl.
CPC .......... *H04L 9/3263* (2013.01); *H04L 9/3252* (2013.01); *H04L 9/3268* (2013.01);
(Continued)

(58) Field of Classification Search
CPC ... H04L 9/3263; H04L 9/3268; H04L 63/123; H04L 9/30; H04L 9/3252;
(Continued)

(56) References Cited

U.S. PATENT DOCUMENTS

| 2007/0223702 A1* | 9/2007 | Tengler | ................. H04L 9/3263 380/270 |
| 2009/0260057 A1* | 10/2009 | Laberteaux | ......... H04L 63/0823 726/2 |

(Continued)

FOREIGN PATENT DOCUMENTS

WO  WO 2011026089 A1 *  3/2011  ............. H04L 63/20

OTHER PUBLICATIONS

Hao Hu; Rongxing Lu; Zonghua Zhang; "VTrust: A Robust Trust Framework for Relay Selection in Hybrid Vehicular Communications"; 2015 IEEE Global Communications Conference (GLOBECOM); Year: May 2015; pp. 1-6.*

(Continued)

*Primary Examiner* — David Garcia Cervetti
*Assistant Examiner* — Courtney Fields
(74) *Attorney, Agent, or Firm* — Slater Matsil, LLP

(57) ABSTRACT

An embodiment method for vehicle messaging includes obtaining initial trust information that includes a root public key (RPK), and obtaining a first pool of group certificate (GC) sets and a first vehicle authentication certificate that includes a first encrypted serial number. The method also includes: selecting from the first pool a first GC and a first group private key (Gpk); determining a first signature in accordance with a first message and a digest function; sending a first datagram that includes the first message and the first signature; receiving a second datagram that includes a second GC and a second signature, the second GC dupli- (Continued)

cating a GC in the first pool; receiving a third datagram that includes a third GC and a third signature, the third GC not duplicating any GC in the first pool; and verifying the second and third datagrams in accordance with the digest function and RPK.

24 Claims, 15 Drawing Sheets

(51) Int. Cl.
  *H04L 9/32* (2006.01)
  *H04W 12/10* (2009.01)
  *H04L 29/08* (2006.01)
(52) U.S. Cl.
  CPC ........... *H04W 12/10* (2013.01); *H04L 63/065* (2013.01); *H04L 63/0823* (2013.01); *H04L 63/123* (2013.01); *H04L 67/02* (2013.01); *H04L 2209/84* (2013.01)
(58) Field of Classification Search
  CPC .............. H04L 2209/84; H04L 63/065; H04L 63/0823; H04L 67/02; H04W 12/10
  See application file for complete search history.

(56) References Cited

U.S. PATENT DOCUMENTS

| | | | |
|---|---|---|---|
| 2010/0031042 A1* | 2/2010 | Di Crescenzo | H04L 63/0869 713/169 |
| 2011/0191581 A1* | 8/2011 | Shim | H04L 67/12 713/158 |

OTHER PUBLICATIONS

"Security Credential Management System Design, Security System Design for Cooperative Vehicle-to-Vehicle Crash Avoidance Applications Using 5.9 GHz Dedicated Short Range Communications (DSRC) Wireless Communications," RITA, Intelligent Transportation Systems Joint Program Office, www.its.dot.gov/index.htm, Draft Report—Apr. 13, 2012, 93 pages.

Standard for Efficient Cryptography "SEC 4: Elliptic Curve Qu-Vanstone Implicit Certificate Scheme (ECQV)," Certicom Research, Jan. 24, 2013, Version 1.0, 32 pages.

Whyte, W. et al., "Camp CA Design," Security Innovation, The Software Security Company, 1609 meeting, Annapolis, Sep. 2011, 32 pages.

* cited by examiner

SYSTEM AND METHOD FOR VEHICLE MESSAGING USING A PUBLIC KEY INFRASTRUCTURE

TECHNICAL FIELD

The present invention relates generally to a system and method for assured vehicle messaging, and, in particular embodiments, to a system and method for vehicle messaging using a Public Key Infrastructure (PKI).

BACKGROUND

As the size and complexity of transportation systems increases, so does the need for effective multi-vehicle crash avoidance systems to improve the safety of vehicles traveling in these systems. Such crash avoidance systems could use messaging between vehicles and infrastructure to relay traffic and crash safety information.

Cryptographic information assurance is a necessity, however, for such a crash avoidance system, both to ensure that vehicle-to-vehicle safety messages are authentic and also to ensure that the privacy of vehicle owners and their travel patterns is safeguarded. Providing this cryptographic support for relayed messages poses significant challenges. Cryptographic key distribution techniques are needed that do not require precise time/calendar keeping or synchronization in vehicles to minimize the cost of each vehicle's On-Board Equipment (OBE).

Additionally, to protect the privacy of vehicle owners, mechanisms should be provided for securely and anonymously delivering cryptographic certificates to vehicles and anonymously revoking these certificates for vehicles that pose a security threat. Yet unless the number of certificates and the size of Certificate Revocation Lists (CRLs) are minimized, the communications infrastructure needed to implement such a crash avoidance system becomes prohibitively expensive as the system's geographic coverage and number of vehicles increases.

SUMMARY

In accordance with an embodiment of the present invention, a method for vehicle messaging is provided. The method includes obtaining, by a first vehicle, initial trust information that includes a root public key (RPK). The method further includes obtaining, by the first vehicle, a message authentication set comprising a first pool of group certificate (GC) sets and a first vehicle authentication certificate (VAC). The first VAC includes a first encrypted serial number (ESN) of the first vehicle. The method also includes selecting, by the first vehicle, a first GC set from the first pool. The first GC set includes a first GC and a first group private key (Gpk). The method further includes determining, by the first vehicle, a first signature in accordance with a first message and a digest function. The first message includes the first GC. The method also includes sending, by the first vehicle, a first datagram that includes the first message and the first signature, receiving, by the first vehicle, a second datagram that includes a second GC and a second signature, wherein the second GC is a duplicate of a GC that is included in the first pool, and receiving, by the first vehicle, a third datagram that includes a third GC and a third signature, wherein the third GC is not a duplicate of any GC that is included in the first pool. The method further includes verifying the second datagram in accordance with the digest function and the RPK, and verifying the third datagram in accordance with the digest function and the RPK.

In accordance with another embodiment of the present invention, a vehicle messaging system is provided. The system includes an OBE configured to reside in a first vehicle. The OBE includes a processor and a non-transitory computer readable medium. Initial trust information is stored in the non-transitory computer readable medium, and this initial trust information includes a RPK. Programming for execution by the processor is stored in the non-transitory computer readable medium, and this programming includes instructions to obtain a message authentication set comprising a first pool of GC sets and a first VAC. The first VAC includes a first ESN of the first vehicle. The programming further includes instructions to select a first GC set from the first pool, wherein the first GC set includes a first GC and a first Gpk, determine a first signature in accordance with a first message and a digest function, wherein the first message includes the first GC, and send a first datagram that includes the first message and the first signature. The programming also includes instructions to receive a second datagram that includes a second GC and a second signature, wherein the second GC is a duplicate of a GC that is included in the first pool, and to receive a third datagram that includes a third GC and a third signature, wherein the third GC is not a duplicate of any GC included in the first pool. The programming further includes instructions to verify the second datagram in accordance with the digest function and the RPK and to verify the third datagram in accordance with the digest function and the RPK.

In accordance with another embodiment of the present invention, a cryptographic support system is provided. The system includes a registration authority (RA) node that includes at least one RA processor, an RA network interface, and an RA storage set. The RA network interface includes an upstream RA port, and the RA storage set includes at least one non-transitory computer readable medium storing RA programming for execution by the at least one RA processor. The RA programming includes instructions to send, at the upstream RA port, a first anonymous registration request that includes a first ESN and an encrypted first vehicle authentication public key (VAPK), and to receive, at the upstream RA port, a first registration package that includes an encrypted first pool of GCs that is encrypted in accordance with the first VAPK. The first pool includes a first GC. The RA programming also includes instructions to send, at the upstream RA port, a second anonymous registration request that includes a second ESN and an encrypted second VAPK, and to receive, at the upstream RA port, a second registration package that includes an encrypted second pool of GCs that is encrypted in accordance with the second VAPK. The second pool includes the first GC and a second GC that is not included in the first pool.

In accordance with another embodiment of the present invention, a method for certificate revocation is provided. The method includes obtaining, by a first node, a first certificate having a first certificate serial number (SN) that is not greater than a maximum allowable certificate SN, obtaining, by the first node, a CRL sent by a revocation station, and determining, by the first node in accordance with the CRL, whether the first certificate is revoked. The CRL includes a bit vector having a first size in bits that is equal to the maximum allowable certificate SN. Each bit in the bit vector has a respective position number and a respective bit value indicating a revocation status of a respective signed certificate having a certificate SN equal to the respective position number. The respective signed certificate is revoked when the respective bit value is a first value and is not revoked when the respective bit value is a second value.

BRIEF DESCRIPTION OF THE DRAWINGS

For a more complete understanding of the present invention, and the advantages thereof, reference is now made to the following descriptions taken in conjunction with the accompanying drawings, in which:

FIG. 1, which includes

FIG. 6, which includes

FIG. 9, which includes

FIG. 10, which includes

DETAILED DESCRIPTION OF ILLUSTRATIVE EMBODIMENTS

An advantage of the present invention is that to reduce the number of certificates that must be downloaded and stored in each vehicle, GCs are shared between multiple vehicles, and in an embodiment certificates are generated inside the Secure Processor (SP) of each vehicle's OBE. The present invention further minimizes infrastructure requirements along vehicle travel paths and requirements for precise time/calendar keeping and synchronization in vehicles. The present invention also uses a simple certificate revocation mechanism and does not require frequent recalculation of revoked vehicle identifiers. Embodiments of the present invention enable operation without compromising privacy for a year or more even if there is no communication with equipment alongside the vehicle travel path, for example, in remote areas.

In an embodiment, the present invention is used in a multi-vehicle collision avoidance system. The system has multiple infrastructure nodes such as PKI nodes, Travel Path Units (TPUs) stationed along vehicle travel paths, and Maintenance Units (MUs) stationed in vehicle repair and maintenance stations. In an embodiment, the TPUs are Road-Side Units (RSUs) stationed along roads. In an embodiment, the system can provide cryptographic support to over a 100 million vehicles. Each vehicle has an OBE that sends safety messages to other vehicles and communicates with infrastructure nodes for cryptographic support.

Figure 1A:
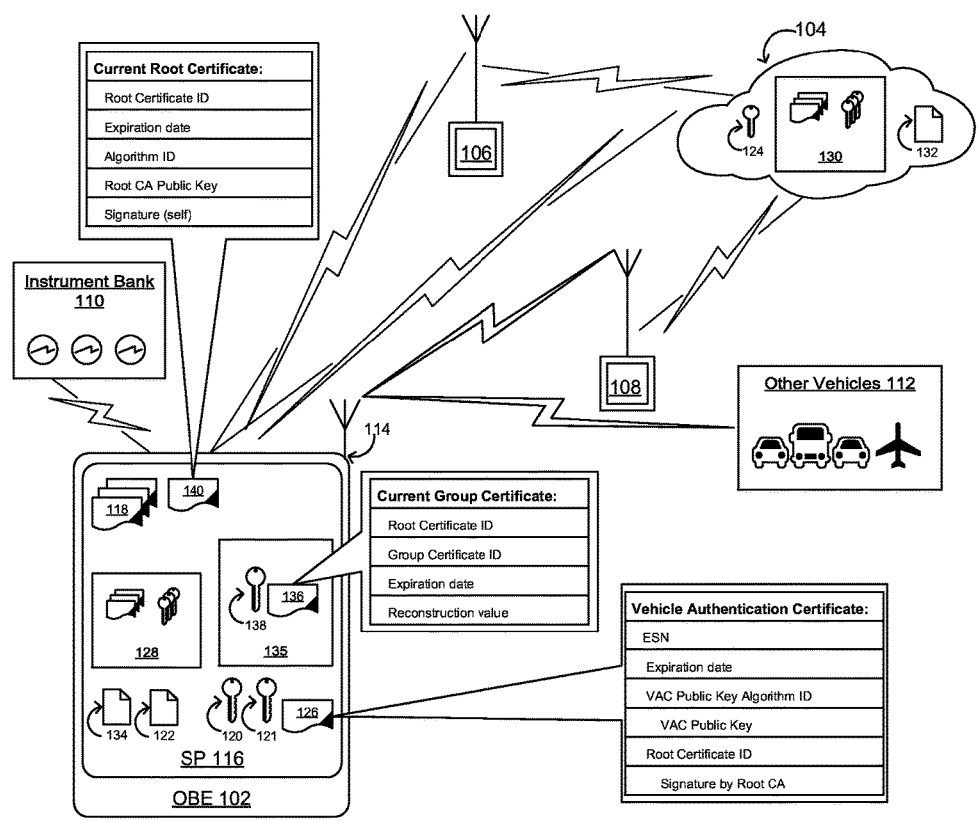
FIGS. 1A and 1B, illustrates a system for vehicle messaging supported by a PKI in accordance with embodiments of the present invention.
Figure 1B:
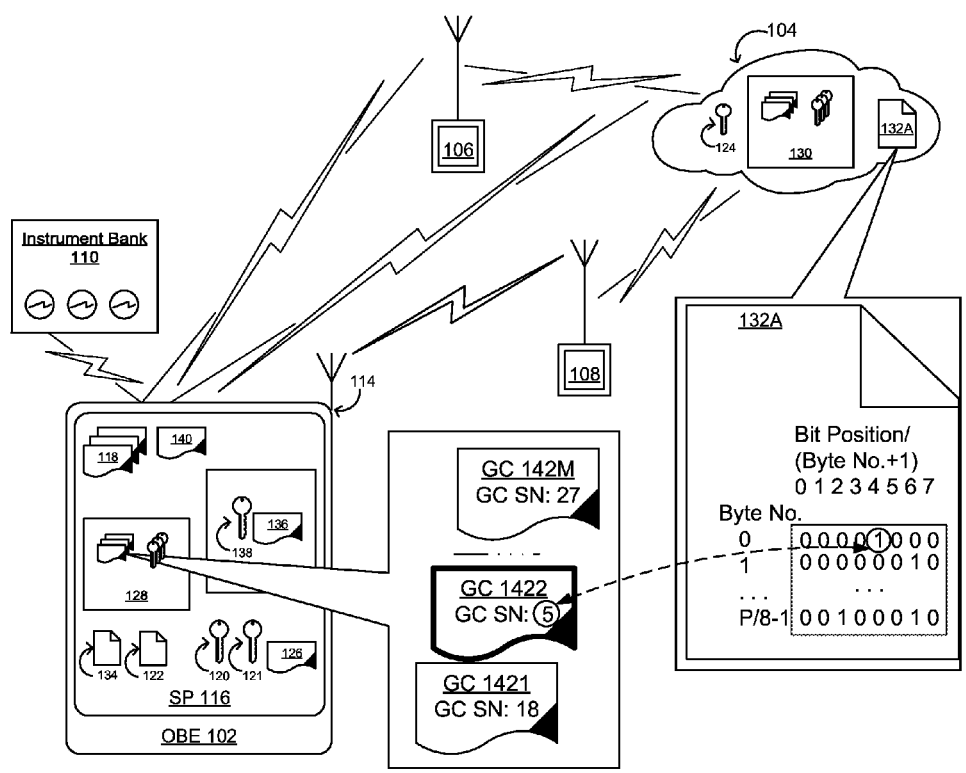

FIG. 1, which includes FIGS. 1A and 1B, illustrates a system for vehicle messaging by an embodiment vehicle OBE 102 supported by a PKI 104. FIG. 1A illustrates interconnections between the various nodes of the system. FIG. 1B illustrates an embodiment CRL 132A that may be used with the system.

Referring to FIG. 1A, a vehicle OBE 102 is connected to the PKI 104 using a temporary or permanent connection such as a cellular connection, Wi-Fi connection, by means of a connection with an MU 106 that is either wired or wireless, or by means of a wireless connection between the OBE 102 and an RSU 108 using, for example, 5.9 GHz Dedicated Short Range Communications (DSRC). Safety messages contain raw or analyzed vehicle instrument data that the OBE 102 obtains by means of a wired or wireless connection with the vehicle instrument bank 110 that includes, for example, the vehicle's speedometer, braking system, and geo-location system. This instrument data includes, for example, speed information, braking information, and GPS data. The OBE 102 modulates these safety messages and then wirelessly broadcasts them to other vehicles 112 using an antenna 114. The OBE 102 also receives safety messages from other vehicles 112 using, for example, the same antenna 114, and demodulates these received safety messages.

Referring again to FIG. 1A, the embodiment OBE 102 includes an SP 116, which may be, for example, an Application Specific Integrated Circuit (ASIC), a Field-Programmable Gate Array (FPGA), a microprocessor, etc. In some embodiments, the SP is a tamper-proofed Hardware Security Module (HSM) that is an internal module, plug-in card, or external device. An HSM provides, for example, tamper evidence such as logging and alerting, tamper resistance (e.g., deleting keys upon detection of tampering or data bus probing), and secure key backup (e.g., backing up keys in an encrypted form in the HSM's internal memory, externally backing up keys using a smartcard or other security token, etc.). In other embodiments, the OBE 102 is an HSM.

The SP 116 obtains initial trust information that includes one or more root certificates (RCs) 118 of the PKI 104, a Vehicle Authentication Private Key (VApk) 120 and VAPK 121 that are a matching private key-public key pair, and a vehicle Serial Number (SN) 122 that is unique for each vehicle serviced by the PKI 104. This initial trust information may be pre-loaded by, for example, a trusted OBE manufacturer, a secure connection to the PKI 104, or any other secure distribution scheme.

The SN 122 may be generated by the SP 116 and may be, for example, a Vehicle Identification Number (VIN) of the vehicle, or the SN 122 may be assigned by the PKI 104. Each RC 118 includes a signature that the PKI 104 generates using a Root Private Key (Rpk) 124. Each RC 118 also includes an RPK that is a matching public key of the Rpk 124, an RC SN or other identifier, an expiration date, and an algorithm identifier for the asymmetric encryption algorithm that was used to sign the RC 118, such as, for example, Elliptic Curve Digital Signature Algorithm (ECDSA).

After sending a registration request to the PKI 104, the OBE 102 obtains a message authentication set generated by the PKI 104. This message authentication set includes GC sets and a VAC 126, which includes an ESN that is unique to each vehicle serviced by the PKI 104. In an embodiment, the ESN may be tagged with a Message Authentication Code (MAC). The VAC 126 is used to authenticate the OBE 102 to infrastructure nodes of 104, 106, 108 or other trusted service equipment, to establish a secure session and to update expired, compromised or revoked certificates such as, for example, GCs and RCs, or to obtain a new VAC 126 at the time of its expiration. The ESN can also be used to identify the OBE 102 when it is a threat to the system or is otherwise misbehaving by, for example, sending messages that do not match their signature, or that are otherwise shown to be wrong messages.

The GC sets received from the PKI 104 are stored in a local pool 128 of the SP 116. Each GC set includes a GC and a Gpk corresponding to the GC. The local pool 128 contains, for example, 10,000 GC sets. Each GC includes an RC identifier, a GC serial number or other identifier, and an expiration date. Each GC is an implicit certificate that includes a reconstruction value for a Group Public Key (GPK) that is a matching public key of the Gpk. Suitable schemes for generating such implicit certificates and their corresponding private keys include, for example, the Optimal Mail Certificates (OMC) scheme and the Elliptic Curve Qu-Vanstone (ECQV) scheme. In an embodiment implicit signature procedure, the respective Gpk for each GC is generated by the PKI using an Rpk for the RC that is identified in the GC, and an RPK of the identified RC can be used to reconstruct the GPK from its reconstruction value. In an alternative embodiment, each GC is an explicit certificate that explicitly includes both an Rpk-generated signature and the GPK.

The GC sets in the local pool 128 are pseudo-randomly selected from a global pool 130 of GC sets of the PKI 104. Because the GC sets of the OBEs in other vehicles 112 are also pseudo-randomly selected from the global pool 130, any GC stored in the local pool 128 may also be stored in the local pool of another vehicle's OBE according to a finite probability that is greater than zero and less than one. Additionally, a GC that is included in a message received from another vehicle may also be present in the local pool 128 of the target OBE 102 according to this finite probability.

The SP 116 performs a further pseudo-random selection of a current GC set 135 from its local pool 128 at intervals so that it can build V2X messages, which are messages to other vehicles 112 or to infrastructure nodes of 104, 106, 108. A current GC set 135 that has been previously selected includes a current GC 136 and its corresponding current Gpk 138. If the current GC set 135 is stale, the SP selects a new current GC set from the local pool 128. The current GC set 135 is stale if it has been the current GC set for longer than a pseudo-randomly determined time interval. This time interval may have an expected value of, for example, five minutes. In other embodiments, the current GC set 135 is stale at precise intervals of, for example, five minutes. The SP 116 then identifies a current RC 140 that corresponds to the RC identifier in the current GC 136.

The OBE 102 can also receive a CRL 132 sent by the PKI 104 and store it as a local CRL 134. The SP 116 can use the local CRL 134 to check whether any of the GCs stored in its local pool 128 are revoked. In an embodiment Over-The-Air Revocation (OTAR) procedure, the SP 116 also uses the local CRL 134 to determine whether a message received from another OBE 102 includes a GC that has been revoked. If so, the OBE 102 ignores the received message and immediately sends a warning message to the OBEs of other vehicles 112 indicating that the GC is revoked. The warning message includes a list of revoked GC identifiers generated by the PKI 104 and digitally signed using an Rpk 124. When the OBE 102 receives such a warning message that is similarly generated by OBEs of other vehicles 112, the OBE 102 verifies its signature using the matching RPK and updates the local CRL 134 to include the revoked GC.

FIG. 1B illustrates an embodiment CRL 132A that may be used with the present invention. The global CRL 132A is a bit-encoded file or other bit vector that can be compressed using traditional compression algorithms and distributed to the OBE 102. In the CRL 132A, the revocation status of any certificate (e.g., GCs 1421 to 142M in FIG. 1B) is represented by a single bit in a position addressed by the certificate's SN. One bit value in the bit position corresponding to the certificate SN indicates that the certificate is revoked, while the opposite bit value indicates it is not revoked.

In an embodiment the CRL 132A must contain at least as many bit positions as a maximum allowable certificate serial number of P. Bits in this CRL 132A are numbered in positions from 0 to P−1 and are stored as bytes numbered from 0 to P/8−1. The corresponding SN for each bit position within the CRL 132A can be calculated by multiplying the byte number by 8, then adding the position of the bit within the byte, and then adding one. For example, a GC 1422 with an SN of 5 is revoked if bit number 4 in byte number 0 of the CRL 132A is 1, but otherwise the GC is still active. In the case of a PKI 104 that uses 100 million GCs, the size of a bit-encoded uncompressed local CRL 132A of the foregoing embodiment would be 12.5 Mbytes. In an example, 100,000,000 GCs are used by the PKI 104, but 1,000 OBEs 102 are misbehaving or compromised and each OBE 102 has 10,000 GCs that are revoked, so that up to 10 million total GCs (10% of all GCs) in the PKI 104 are revoked. A suitable compression algorithm can compress the global CRL 132A sent by the PKI 104, which has 10 million (or 10%) of its bit values set to 1, to a compressed size of 1 to 2 Megabytes or less. In an embodiment, the CRL 132A lists only certificates of vehicles that are misbehaving. In other embodiments, the CRL 132A also lists certificates that are revoked when a vehicle goes out of service.

In an alternative embodiment, a bit value of 0 in a CRL indicates that a corresponding certificate is revoked. In another alternative embodiment, the CRL can use multiple bits instead of single bits to represent not only an SN but also a version number for each certificate that can be re-issued as a new version. Using multiple bits allows increasing the lifetime of the CRL by reusing revoked multi-bit positions for re-issued certificates. For example, a multi-bit position that includes 4 bits (representing multi-bit values from 0 to 15) can be used to encode a single certificate revocation status in the global CRL. In this example, a multi-bit value of 0 represents that no versions of a certificate are revoked, and multi-bit values from 1 to 14 represent, respectively, that versions 1 to 13 of the certificate are revoked. A multi-bit value of 15 indicates that the certificate is revoked until its expiration date. When a certificate is being revoked, its version number in the global CRL is incremented (e.g., from 1 to 2) by the PKI 104 and a CRL update is distributed to the OBEs. An OBE 102 compares the version number of a received or stored GC with the respective version number that is stored as a multi-bit value in its local CRL 134 at a corresponding multi-bit position. If the multi-bit value stored in the local CRL 134 is greater than the version number of the GC, then the GC is revoked.

Figure 2:
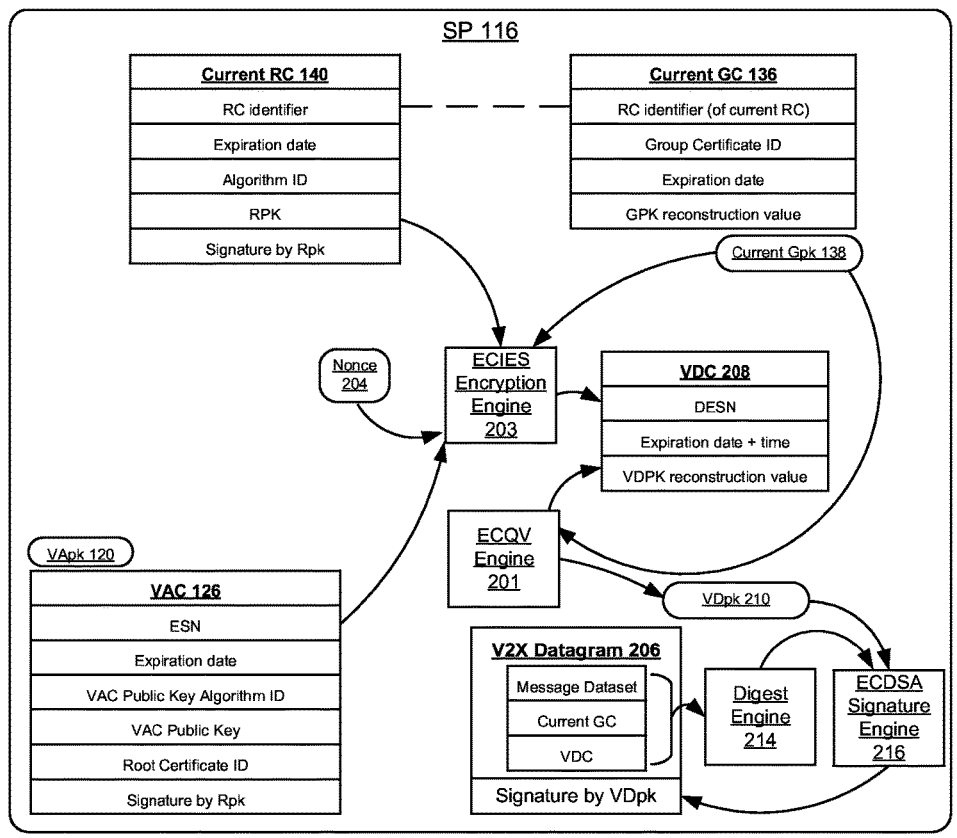
FIG. 2 illustrates a vehicle processor capable of building a secure message in accordance with a first embodiment of the present invention.

FIG. 2 shows a first embodiment of an SP 116 capable of building a V2X message. An Elliptic Curve Integrated Encryption Scheme (ECIES) encryption engine 203 concatenates the ESN with a nonce 204. In other embodiments, the concatenated ESN also includes a MAC. Referring again to FIG. 2, the SP 116 encrypts the concatenated ESN in accordance with the current Gpk 138, the RPK of the current RC 140, and the ECIES algorithm to produce a double-encrypted serial number (DESN) of the vehicle.

In the first embodiment, the SP 116 generates a V2X datagram 206 that includes a message dataset, a copy of the current GC 136, a copy of a Vehicle Dynamic Certificate (VDC) 208 that includes the DESN, and a signature by a Vehicle Dynamic Private Key (VDpk) 210. The VDC 208 is an implicit certificate that includes the DESN and a reconstruction value for a vehicle dynamic public key (VDPK) that is a matching public key of the VDpk 210. An ECQV engine 201 generates this VDPK reconstruction value. A VDC expiration date and time are also included in the VDC 208. The VDpk 210 is generated by the ECQV engine 201 using the VDPK reconstruction value and the current Gpk 138. The SP 116 then builds a message that includes a message dataset, the current GC 136, and the VDC 208. The SP 116 calculates a message signature by first sending this message to a digest engine 214, which calculates a digest of the message using, for example, a secure hash function such as SHA-256. An ECDSA signature engine 216 then calculates the message signature using the message digest and the VDpk 210. The OBE 102 then modulates and broadcasts the V2X datagram 206 that includes the message and the message signature.

Figure 3:
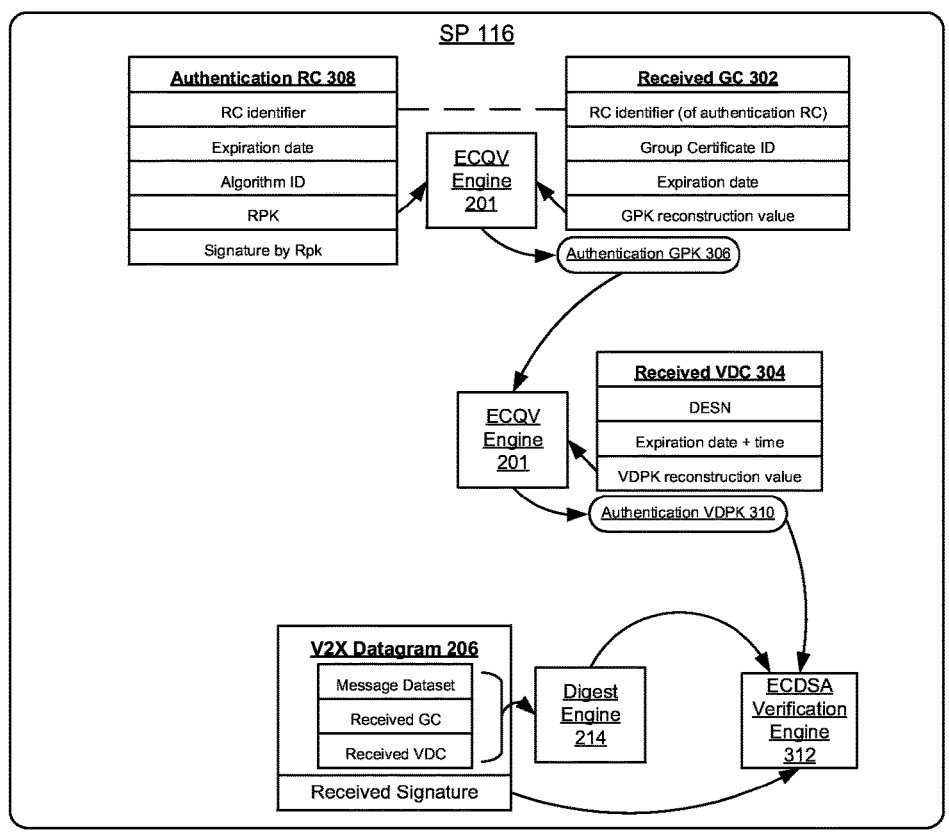
FIG. 3 illustrates receiving a secure message in the embodiment processor of FIG. 2.

FIG. 3 illustrates receiving a V2X datagram in the embodiment SP of FIG. 2. When the OBE 102 receives and demodulates a V2X datagram 206 that was similarly generated by an OBE of another vehicle or from an infrastructure element, it authenticates the datagram 206. This received datagram 206 includes a GPK reconstruction value in a received GC 302 and a VDPK reconstruction value in a received VDC 304. The received VDC 304 also includes sender data in the form of the sending OBE's DESN. The SP 116 reconstructs the authenticating GPK 306 in the ECQV engine 201 using the received GPK reconstruction value and using an RPK of an authenticating RC 308, which is the RC identified in the received GC 302. This authenticating RC 308 was pre-shared by the PKI 104 with both the SP 116 and the sender of the datagram 206.

The SP 116 then reconstructs the authenticating VDPK 310 in the ECQV engine 201 using the received VDPK reconstruction value and the authenticating GPK 306. The SP 116 calculates its own digest of the datagram's message in the digest engine 214, and then uses the calculated digest and the authenticating VDPK 310 in an ECDSA verification engine 312 to verify the signature of the received datagram 206. If signature verification succeeds, then datagram 206 is verified as authentic.

Figure 4:
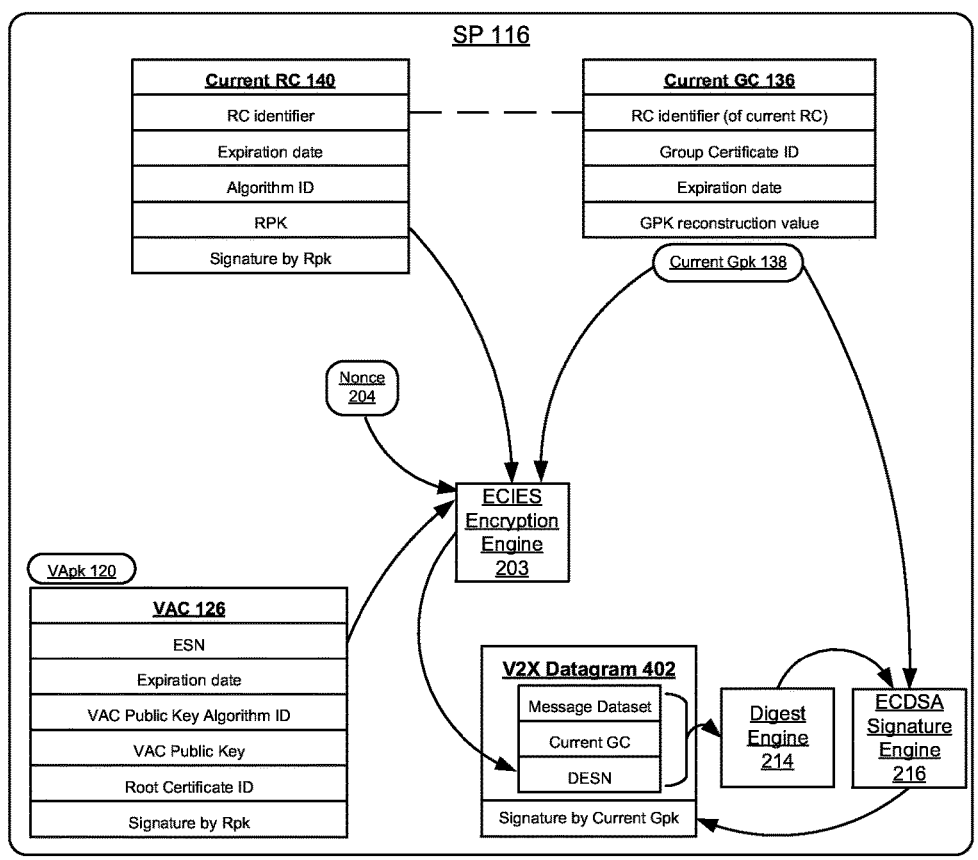
FIG. 4 illustrates a vehicle processor having the advantage of reduced message size in accordance with embodiments of the present invention.

FIG. 4 shows a second embodiment SP 116 that has the advantage of reduced V2X message size. The difference between this embodiment and the embodiment of FIG. 2 is that a transmitted V2X datagram 402 is signed by the current Gpk 138 instead of a VDpk, and the V2X datagram 402 directly includes a DESN and does not include a VDC. The SP 116 calculates the signature of an outgoing message by calculating a digest of this message in digest engine 214 and then by generating the message signature in the ECDSA signature engine 216 using the message digest and the current Gpk 138. The OBE 102 then broadcasts the datagram 402, which includes the message dataset, a copy of the current GC 136, the DESN, and the message signature.

Figure 5:
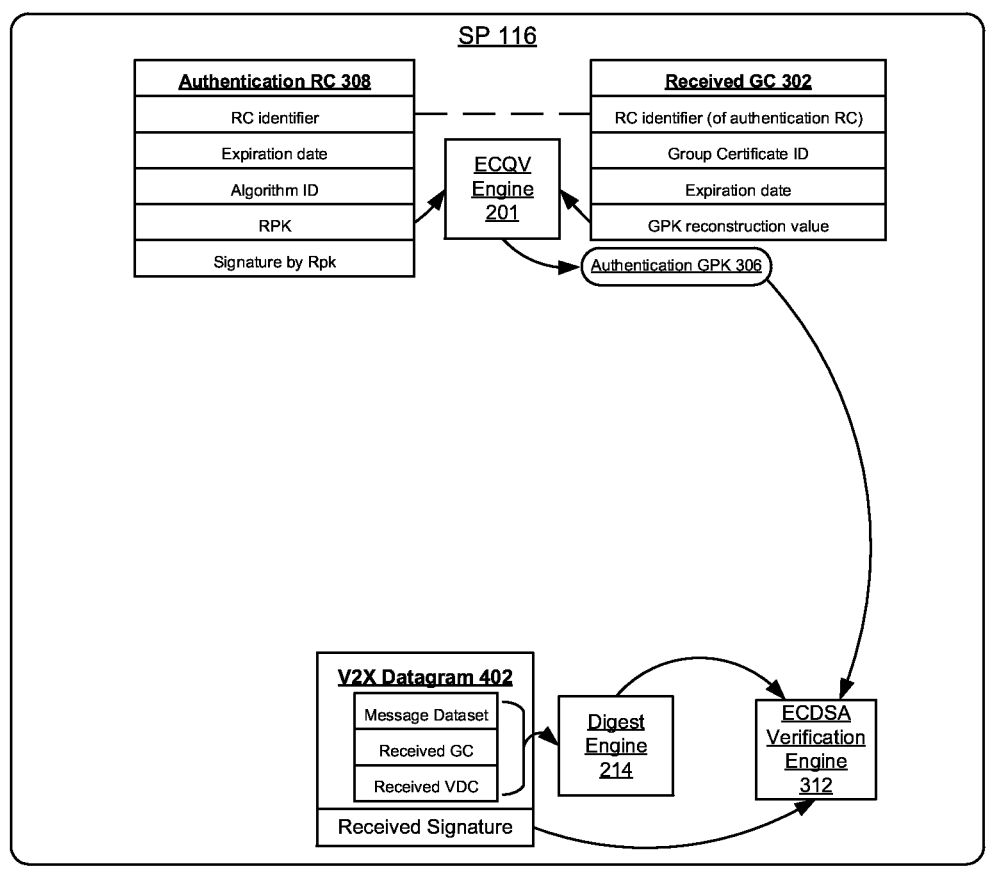
FIG. 5 illustrates receiving a secure message in the embodiment processor of FIG. 4.

FIG. 5 illustrates receiving a V2X message that is generated according to the embodiment SP of FIG. 4. The V2X datagram 402 to be authenticated includes a received GC 302 that includes a GPK reconstruction value. The ECQV engine 201 reconstructs an authentication GPK 306 using the GPK reconstruction value and the RPK of an authentication RC 308 that is identified in the received GC 302. The digest engine 214 calculates a second digest of the message in the received datagram 206. The ECDSA verification engine 312 then uses the calculated digest and the authentication GPK 306 to verify the message signature. If signature verification succeeds, then datagram 402 is verified as authentic.

Figure 6A:
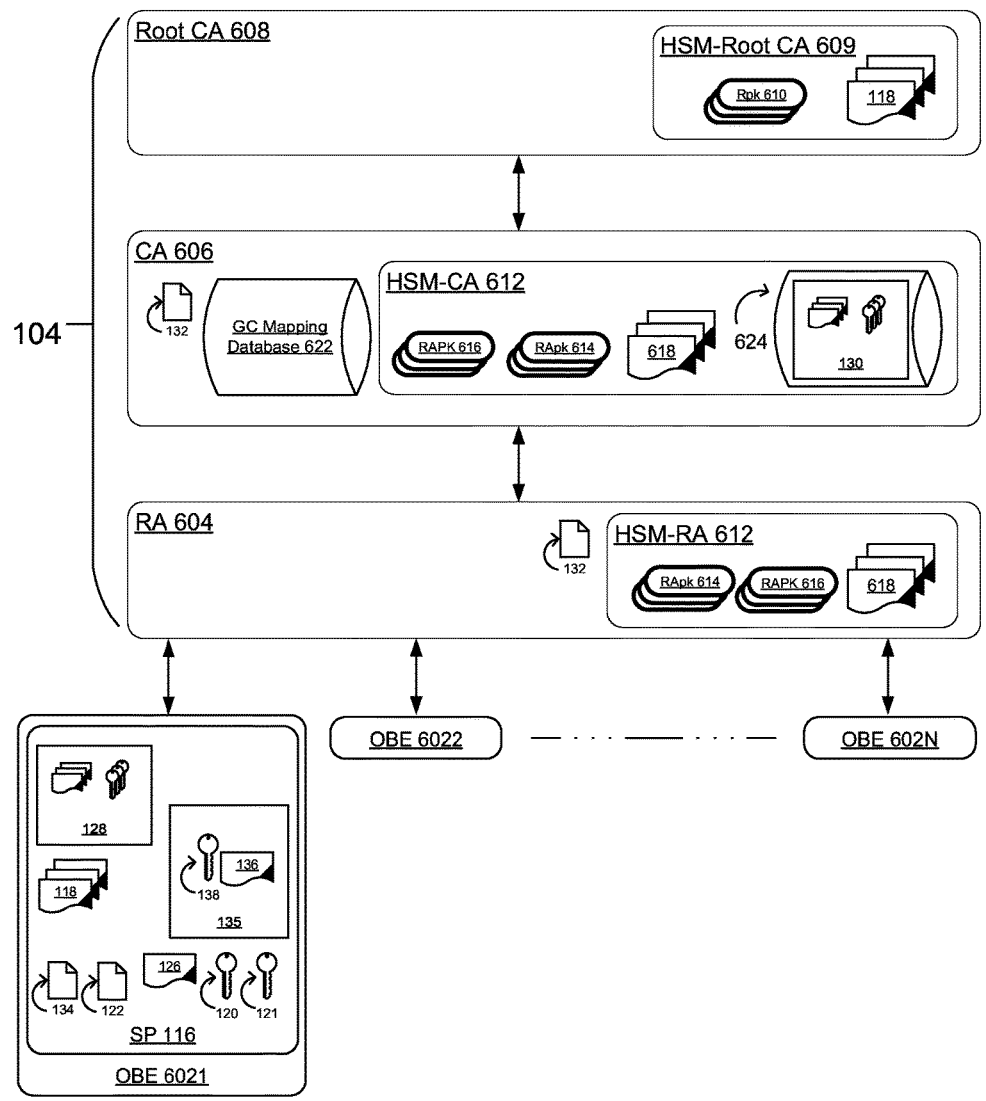
FIGS. 6A and 6B, illustrates a PKI and other infrastructure nodes supporting vehicle messaging in accordance with embodiments of the present invention.
Figure 6B:
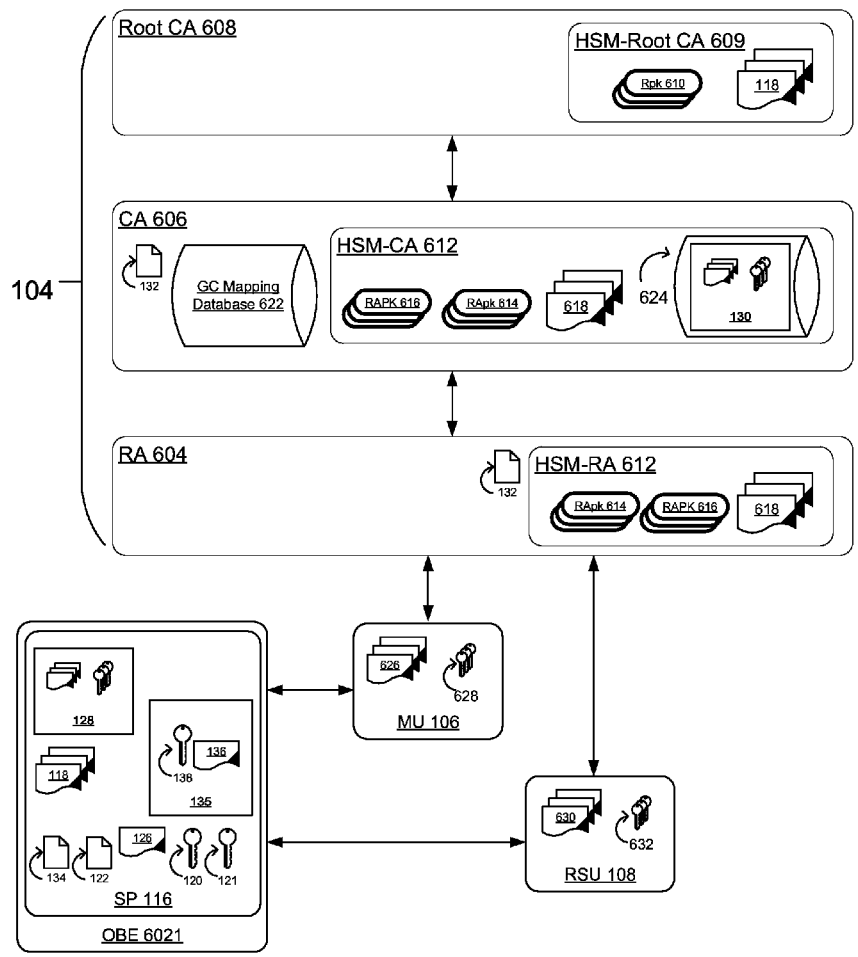

FIG. 6, which includes FIGS. 6A and 6B, illustrates a PKI and other infrastructure nodes supporting the OBEs. FIG. 6A illustrates an embodiment PKI 104 servicing vehicle OBEs 6021 to 602N. FIG. 6B illustrates an embodiment system in which MU 106 and RSU 108 infrastructure nodes are also used.

Referring now to FIG. 6A, an embodiment PKI 104 servicing vehicle OBEs 6021 to 602N includes a Registration Authority (RA) 604 that has a temporary or permanent connection to downstream vehicle OBEs 6021 to 602N, a Certificate Authority (CA) 606, and a root CA 608. The root CA 608 includes a Root CA Hardware Security Module (HSM-Root CA) 609. The HSM-Root CA securely stores a set of RCs 118 that is part of the initial trust information pre-loaded into OBEs 60421 to 602N. The HSM-Root CA also securely stores a respective Rpk 610 that is a matching private key for the RPK of each RC in the set of RCs 118.

The CA 606 is located at an intermediate tier upstream from the RA 604 and downstream from the root CA 608. The CA 606 is serviced by a CA Hardware Security Module (HSM-CA) 620 and a GC mapping database 622. The HSM-CA 620 also includes a secure database 624 that stores the global pool 130 of GC sets. In a first embodiment, the RA 604 is serviced by an RA Hardware Security Module (HSM-RA) 612, which includes a secure crypto-processor that performs encryption and decryption using one or more RA Private Key (RApk) 614 and one or more RA Public Key (RAPK) 616, where each RApk 614 corresponds to an RA Certificate (RAC) in a set of RACs 618 that is signed (either explicitly or implicitly) by the root CA 608. In a second embodiment, the HSM-RA performs encryption and decryption using one or more RA Symmetric Keys (RASKs). In both of the two foregoing embodiments, each RApk 614 or RASK is a secret key that is known only to the RA.

FIG. 6B shows an embodiment system in which MU 106 and RSU 108 infrastructure nodes are also used. An OBE 6021 in communication with an MU 106 or RSU 108 can use its VAC 126 and VApk 120 to mutually authenticate and establish a secure channel with the RA 604.

An MU 108 has a wired or wireless connection with the RA 604 and establishes a secure communication channel between the RA 604 and a vehicle OBE 6021 during vehicle maintenance to update expired, expiring, or revoked GC sets in its local pool 128. Each MU 106 stores MU Authentication Certificates (MUACs) 626 that are signed (either explicitly or implicitly) by the CA 606 or root CA 608. Each MUAC 626 has a corresponding MU Private Key (MUpk) 628 that is a matching private key of an MU Public Key (MUPK) included in the MUAC 626. The MU 106 uses a mutual authentication sequence to update GC sets for a connected OBE 6021. The MU 106 must prove to the OBE 6021 that it has a valid MUAC 626 (which includes a valid MUPK) and a valid corresponding MUpk 628. The OBE 6021 must in turn prove to the MU 106 that it has a valid VAC 126, VApk 120, and VAPK 121. Mutual authentication is performed by generating ECDSA signatures over random challenges generated by both sides. Successful verification of signatures on both sides enables further communication in a secure channel between the OBE 6021 and the MU 106. The CA 606 can then use this secure communication channel to transfer to the OBE 6021 a batch of GC sets that have been selected from the global pool 130 of GC sets and that have been encrypted using the OBE's VAPK 121.

An RSU 108 is stationed along the travel path of vehicles serviced by the PKI 104. Each RSU 108 stores RSU Authentication Certificates (RSUACs) 630 that are signed (either explicitly or implicitly) by the CA 606 or by the root CA 608. Each RSUAC 630 has a corresponding RSU Private Key (RSUpk) 632 that is a matching private key of a RSU Public Key (RSUPK) that is included in each respective corresponding RSUAC 630. Each RSU 108 periodically communicates with the RA 604 via a wired or wireless connection to securely download an updated CRL 132 that has been issued by the CA 606, or to securely download updated RCs to replace expiring, expired, or revoked RCs in the RC set 118 of a nearby OBE 6021. The RSU 108 then wirelessly broadcasts the CRL 132 or the RC updates to the OBE 6021.

The VAC 126 of a misbehaving OBE, for example, OBE 6021, can be used by a different OBE, for example, OBE 6022, to identify the OBE 6021 as a security threat. The OBE 6021 is then revoked by the PKI 104, and all GCs in the local pool 128 of the OBE 6021 are also identified by the PKI 104 in order to revoke these potentially compromised GCs in all other vehicles. To issue and distribute a global CRL 132 for such a revocation, knowledge of two PKI authorities' private/secret keys (an RASK or an RApk 614, and an Rpk 610) is required to decrypt the DESN that is included in the VAC 126 (and is copied in a V2X datagram sent by OBE 6021 to OBE 6022). In an embodiment, the PKI 104 also includes one or more linkage authorities that are connected between the RA 604 and the OBEs 6021-602N and that further obfuscate the identity of the OBEs 6021-602N from the other nodes of the PKI 104 through the use of linkage certificates stored in the OBEs 6021-602N.

Figure 7:
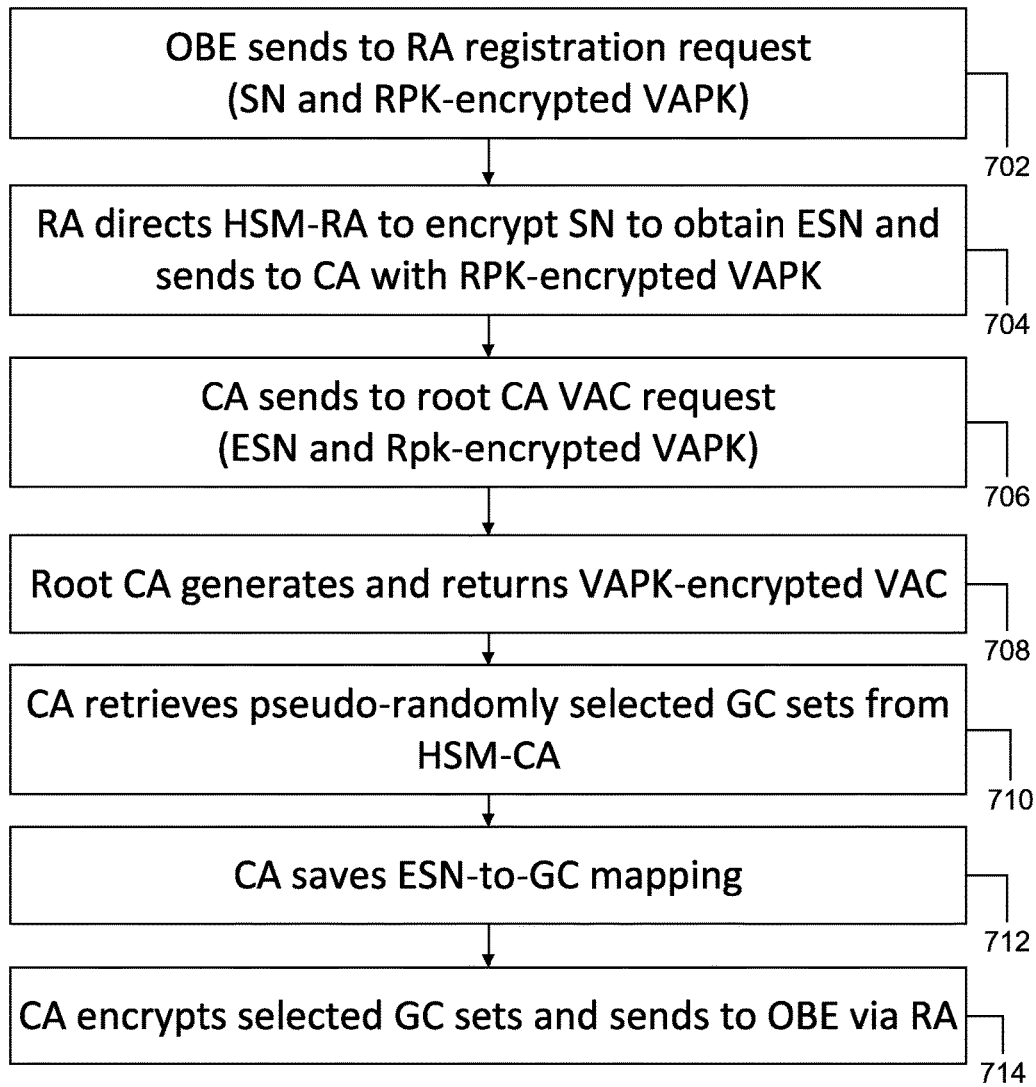
FIG. 7 is a flow diagram illustrating an embodiment method of registering with the PKI in accordance with embodiments of the present invention.

FIG. 7 is a flow diagram illustrating an embodiment method of registering with the PKI. Before an OBE can begin sending messages to other OBEs, it must first receive a message authentication set by registering with the PKI. At 702, an OBE first sends a registration request to the RA. This registration request includes the OBE's VAPK that the OBE has encrypted using an RPK of one of its locally stored RCs. This registration request also includes the vehicle SN. At 704, the RA then directs the HSM-RA to encrypt the vehicle SN to produce an ESN. The RA then sends to the CA an anonymous registration request that includes the ESN and the RPK-encrypted VAPK. In an embodiment, the ESN in this anonymous registration request is tagged with a MAC that is generated by the HSM-RA using a cryptographic MAC function in accordance with the vehicle SN and an RASK. At 706, the CA forwards the anonymous registration request to the root as a VAC request. At 708, the root uses an Rpk to decrypt the RPK-encrypted VAPK to obtain the VAPK. The root packages this VAPK and the ESN in a VAC that is unique to each vehicle serviced by the PKI. The root signs the VAC using an Rpk that corresponds to an RC identified in the VAC. The root encrypts the VAC using the VAPK and sends the VAPK-encrypted VAC to the CA.

At 710, the CA then requests a batch of GC sets from the HSM-CA. The HSM-CA provides the CA with a pseudo-randomly selected batch of GC sets (e.g., 1,000 GCs, each with its Gpk) from the global pool. In an embodiment, the algorithm to pseudo-randomly select the batch of GC sets is chosen to minimize the number of duplicate GCs in the OBEs of multiple vehicles, meaning that revoking all GCs of any vehicle will revoke minimal number of GCs in any other vehicle's local pool.

At 712, the CA then sends the ESN and the GC identifiers of the selected GC sets to the GC mapping database, which stores an association between the ESN and the GC identifiers. To maintain the privacy of vehicle users, the relationship between the GC identifiers and vehicle OBEs is only indexed using an ESN instead of an unencrypted vehicle SN (which is shared with the RA but not the CA or root).

At 714, the CA then uses the VAPK to encrypt the selected GC sets. The CA then sends to the RA a registration package that includes the VAPK-encrypted VAC and the VAPK-encrypted batch of GC sets. The RA forwards this registration package to the requesting OBE. The OBE can use the VApk to decrypt the VAPK-encrypted VAC and the VAPK-encrypted batch of GC sets to obtain the VAC and the batch of GC sets.

Figure 8:
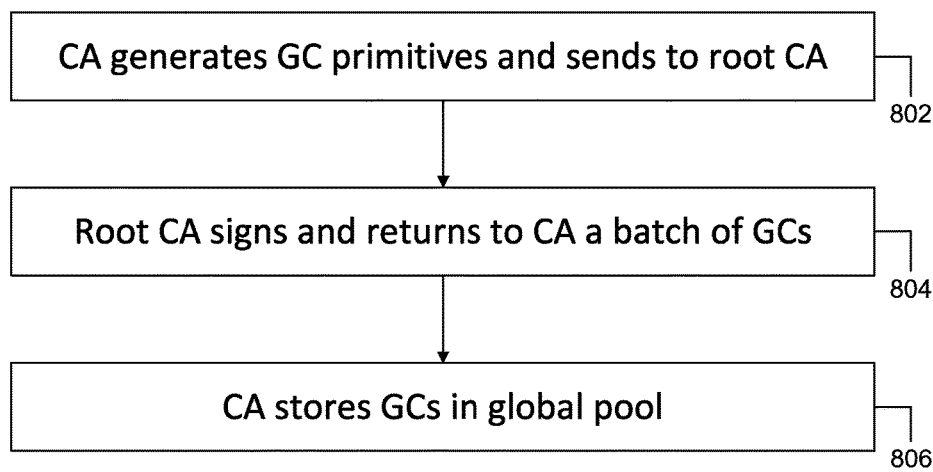
FIG. 8 is a flow diagram illustrating an embodiment method for preparing the PKI for vehicle registration in accordance with embodiments of the present invention.

In FIG. 8, an embodiment method for preparing the PKI for OBE registration is illustrated. This preparation occurs in periodic intervals, for example, once a year. At 802, the CA first generates a batch of GC primitives, each of which includes a Gpk and an unsigned GC. The CA sends the unsigned GCs to the root CA. At 804, the root signs each unsigned GC (either explicitly or implicitly) using an Rpk for an RC identified in the unsigned GC. When this signing is performed by an implicit signature scheme, the root CA uses the corresponding Rpk for each unsigned GC to generate a respective reconstruction value for a GPK that is a matching public key of the unsigned GC's Gpk, and then includes this GPK reconstruction value in the signed GC. At 806. the CA then receives the GCs from the root CA and stores each with its Gpk in the HSM-CA database to augment the global pool of GC sets. Each GC set generated in this fashion is valid for a long time period, for example, one year.

Figure 9A:
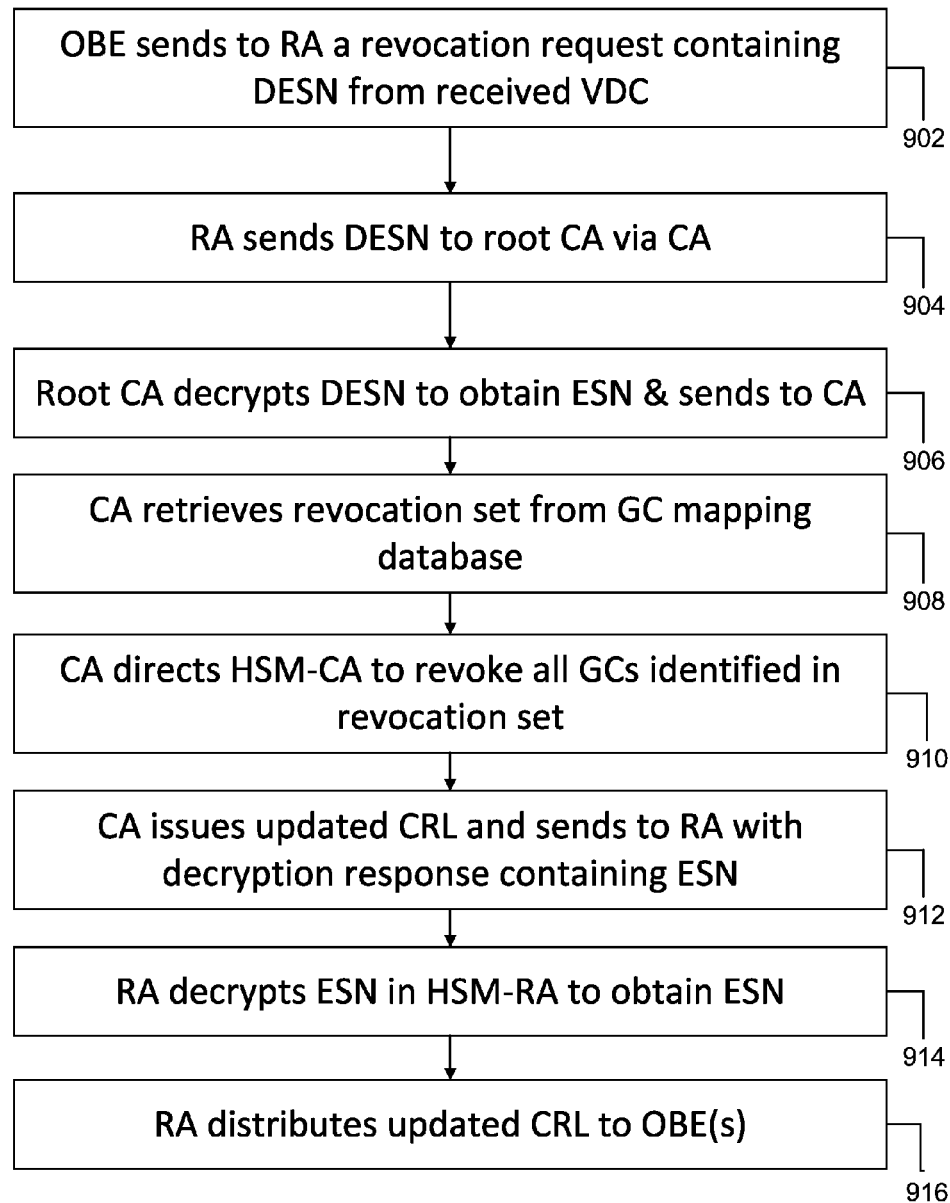
FIGS. 9A and 9B, illustrates embodiment revocation methods of the present invention.
Figure 9B:
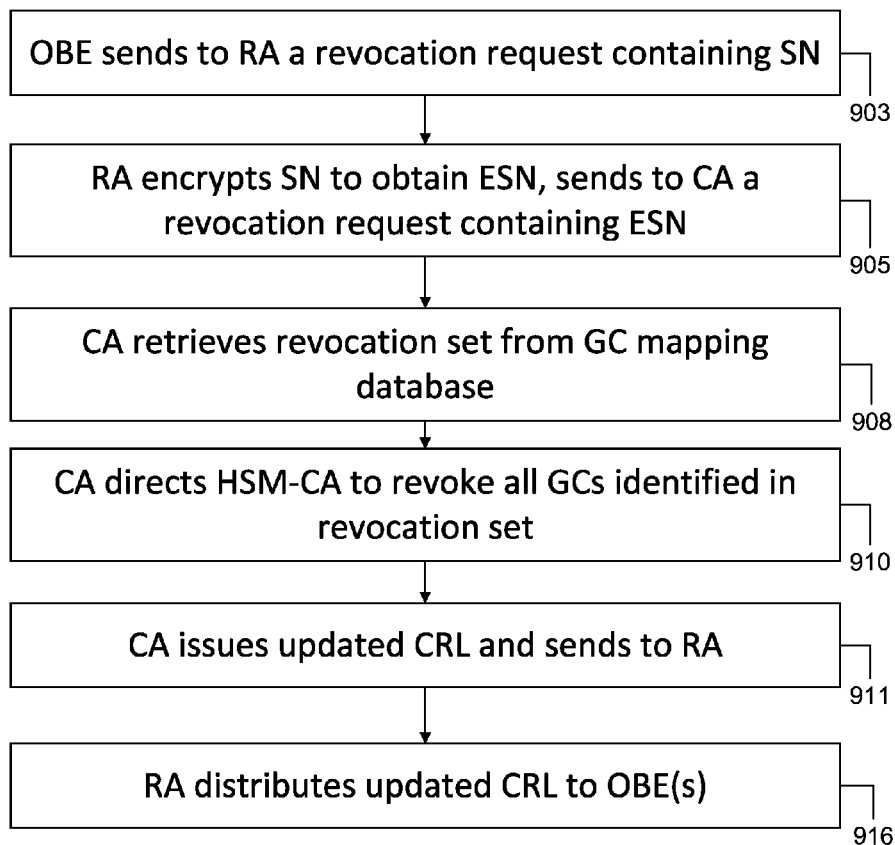

FIG. 9, which includes FIGS. 9A and 9B, illustrates embodiment revocation methods of the present invention. FIG. 9A illustrates an embodiment revocation method in which a misbehaving OBE is referred by another OBE to the PKI as a security threat. FIG. 9B illustrates an embodiment revocation method in which an OBE self-reports a compromise of its own security.

Referring now to FIG. 9A, in an embodiment revocation method the VAC of a misbehaving OBE is used by a second OBE to identify the misbehaving OBE to the PKI as a security threat. At 902, the RA receives a revocation request for a threat OBE. This threat revocation request includes a DESN of the threat OBE that was included in a VDC received by the reporting OBE. At 904, the RA forwards this DESN in a decryption-revocation request to the CA. The CA then forwards the DESN in a decryption request to the root CA. At 906, the root CA then uses an Rpk to decrypt the DESN to obtain an ESN of the threat OBE. The root CA then sends this ESN to the CA so that the CA may process this anonymous revocation request. At 908, the CA requests from the GC mapping database a revocation set that includes GC identifiers that are mapped to the OBE to be revoked. The GC mapping database calculates this revocation set and sends it back to the CA. At 910, the CA then sends this revocation set to the HSM-CA, which revokes all the GCs that are identified in the revocation set. At 912, the CA then updates the PKI's CRL to indicate that each GC identified in the revocation set is revoked. At 914, the RA then sends the ESN of the OBE to be revoked to the HSM-RA for decryption. The HSM-RA decrypts this ESN and sends the SN of the revoked OBE back to the RA. In an embodiment, the ESN has been tagged with a MAC that the HSM-RA authenticates using an RASK. At 916, the RA then distributes the updated CRL to one or more OBEs that are connected to the RA.

In the embodiment revocation method of FIG. 9B, an OBE may self-report a compromise of its own security. At 903, the OBE sends a revocation request to the RA that includes the vehicle SN. At 905, the RA then sends the SN to the HSM-RA for encryption. The HSM-RA then provides an ESN for the compromised OBE. The RA then sends this ESN in an anonymous revocation request to the CA. In an embodiment, the ESN in this anonymous revocation request is tagged with a MAC that is generated by the HSM-RA using a cryptographic MAC function in accordance with the vehicle SN and an RASK.

At 908, the CA then requests from the GC mapping database a revocation set that includes GC identifiers that are mapped to the OBE to be revoked. The GC mapping database calculates this revocation set and sends it back to the CA. At 910, the CA then sends this revocation set to the HSM-CA, which revokes all the GCs that are identified in the revocation set. At 911, the CA then updates the PKI's CRL to indicate that each GC identified in the revocation set is revoked, and the CA sends this updated CRL to the RA. At 916, the RA then distributes the updated CRL to one or more OBEs that are connected to the RA.

Figure 10A:
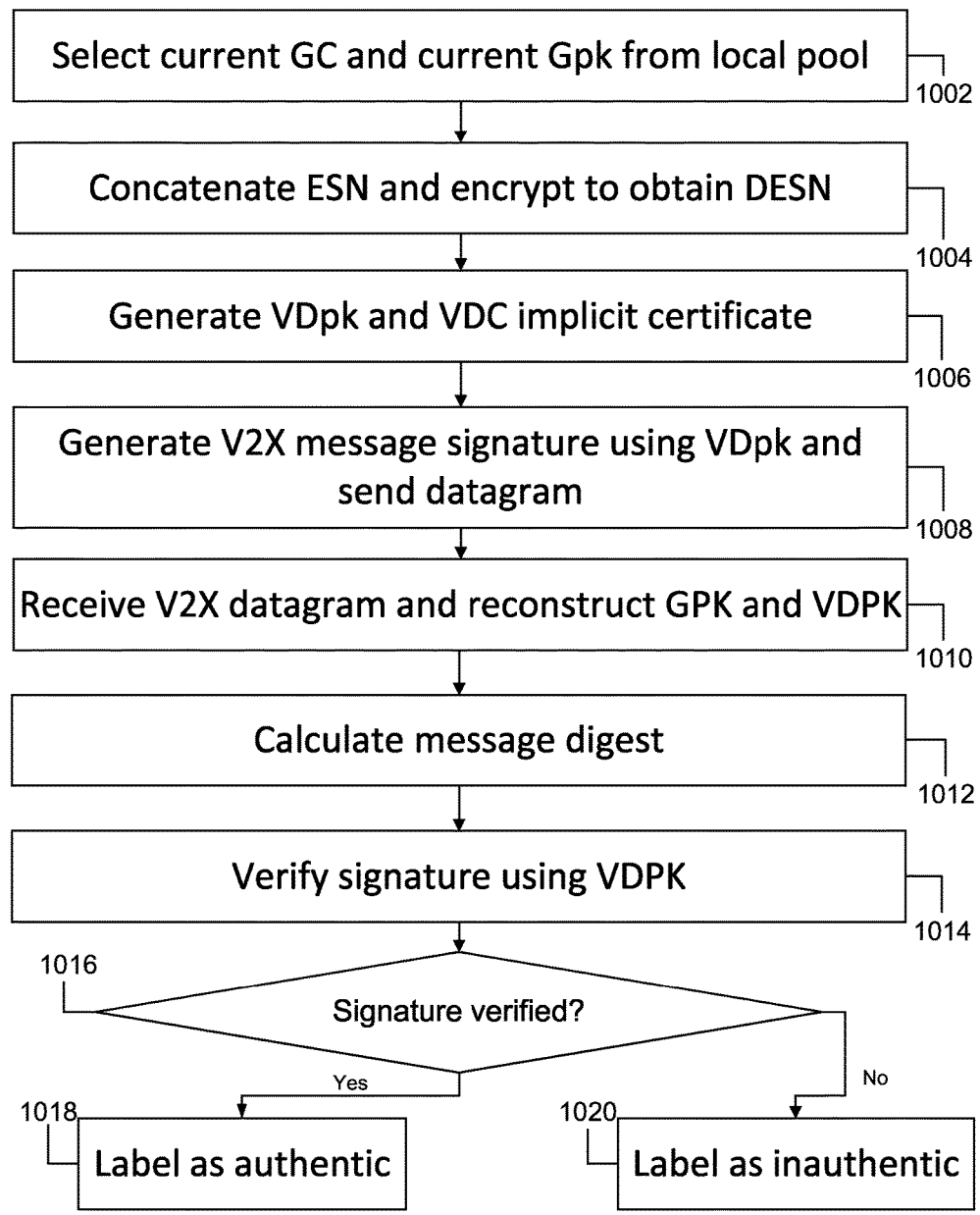
FIGS. 10A and 10B, illustrates methods of secure message generation and verification in accordance with embodiments of the present invention.
Figure 10B:
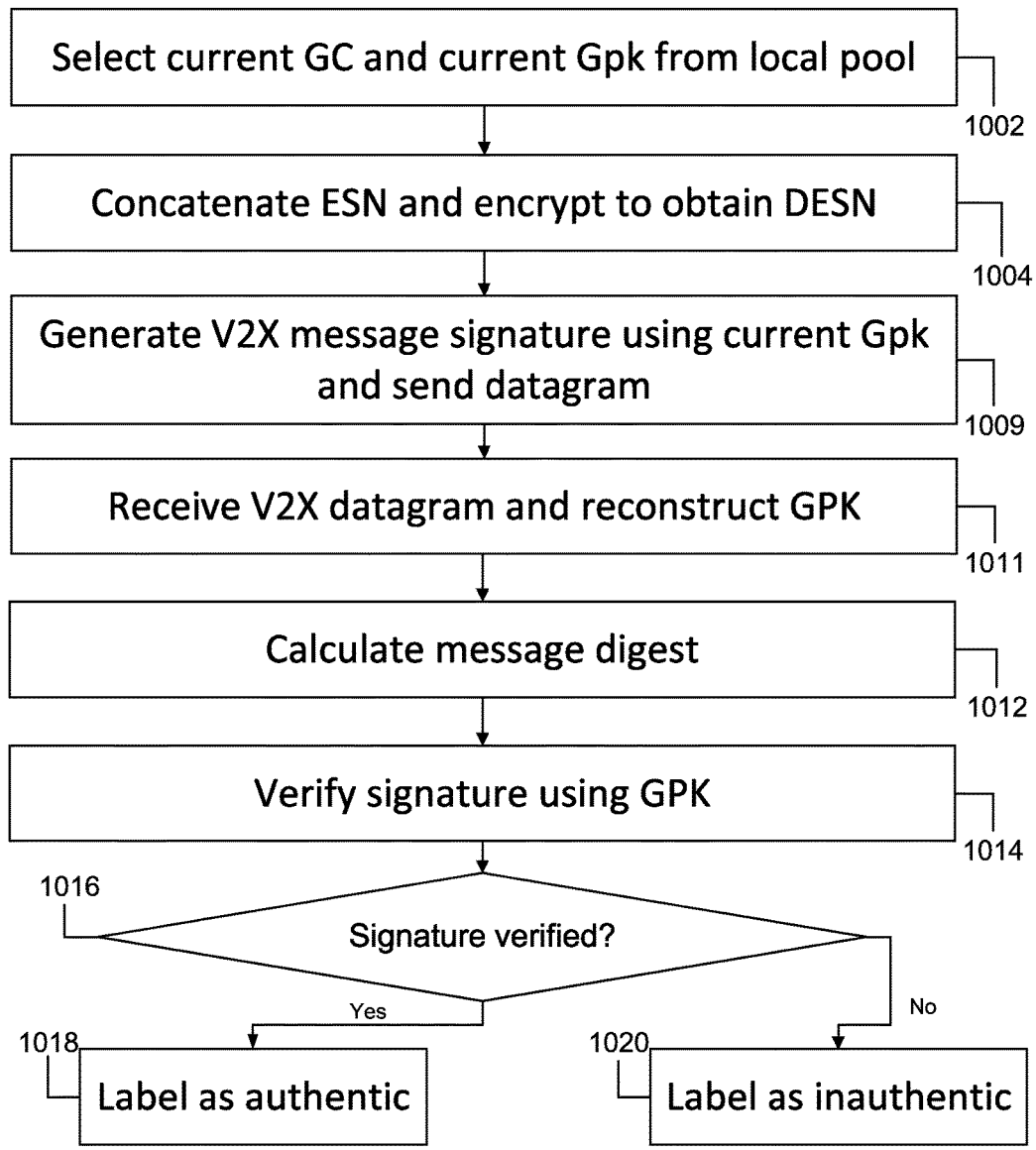

FIG. 10, which includes FIGS. 10A and 10B, illustrates embodiment methods of V2X message generation and verification. FIG. 10A shows a first embodiment method of V2X message generation and verification. FIG. 10B shows a second embodiment messaging method that has the advantage of reduced V2X message size.

Referring now to FIG. 10A, a first embodiment method of V2X message generation and verification is shown. At 1002, an SP of a vehicle OBE pseudo-randomly selects a current GC and current Gpk from its local pool. At 1004, an ECIES encryption engine then concatenates the ESN with a nonce and encrypts this concatenated ESN in accordance with the RPK of the current RC, the current Gpk, and the ECIES algorithm to produce a DESN of the vehicle.

At 1006, an ECQV engine of the SP generates a VDC that includes a VDPK reconstruction value and an expiration date and time. The ECQV engine also generates a VDpk using the current Gpk. The SP then builds a message that includes a message dataset, the current GC, and the VDC. At 1008, the SP calculates a message signature. A digest engine first calculates a digest of a message that includes a message dataset, the current GC, and the VDC. An ECDSA signature engine then calculates the message signature using the message digest and the VDpk. The OBE then modulates and broadcasts a V2X datagram that includes the message and the message signature.

At 1010, another OBE 102 receives and demodulates the V2X datagram and then authenticates the datagram. This received datagram includes a GPK reconstruction value in the received GC and a VDPK reconstruction value in the received VDC. The receiving SP reconstructs the authenticating GPK in an ECQV engine using the received GPK reconstruction value and using an RPK of an authenticating RC, which is the RC identified in the received GC. The SP then reconstructs the authenticating VDPK in the ECQV engine using the received VDPK reconstruction value and the authenticating GPK. At 1012, the SP calculates its own digest of the datagram's message in a digest engine. At 1014, the SP uses the calculated digest and the authenticating VDPK in an ECDSA verification engine to verify the signature of the received datagram. At 1016, if signature verification succeeds, then datagram is verified as authentic at block 1018. If signature verification fails, then the datagram is labeled as inauthentic at block 1020.

FIG. 10B shows an embodiment second messaging method that has the advantage of reduced V2X message size. The difference between this embodiment and the embodiment of FIG. 10A is that a transmitted V2X datagram is signed by the current Gpk instead of a VDpk, and the message contained in the V2X datagram directly includes a DESN and does not include a VDC. At 1002, an SP pseudo-randomly selects a current GC and current Gpk from its local pool. At 1004, the SP concatenates the ESN with a random nonce and encrypts it to obtain the DESN. At 1009, the SP calculates the signature of an outgoing message by calculating a digest of this message in a digest engine and then generating the message signature in an ECDSA signature engine using the message digest and the current Gpk. The OBE then broadcasts the V2X datagram, which includes the message dataset, the current GC, the DESN, and the message signature.

At 1011, another OBE receives and demodulates the V2X datagram to be authenticated. This V2X datagram includes a received GC that includes the GPK reconstruction value. An ECQV engine reconstructs an authentication GPK using the GPK reconstruction value and the RPK of an authentication RC that is identified in the received GC. At 1012, the SP calculates its own digest of the datagram's message in a digest engine. At 1014, an ECDSA verification engine uses the calculated digest and the authentication GPK to verify the message signature. At 1016, if signature verification succeeds, then the datagram is verified as authentic at block 1018. If signature verification fails, then the datagram is labeled as inauthentic at block 1020.

Figure 11:
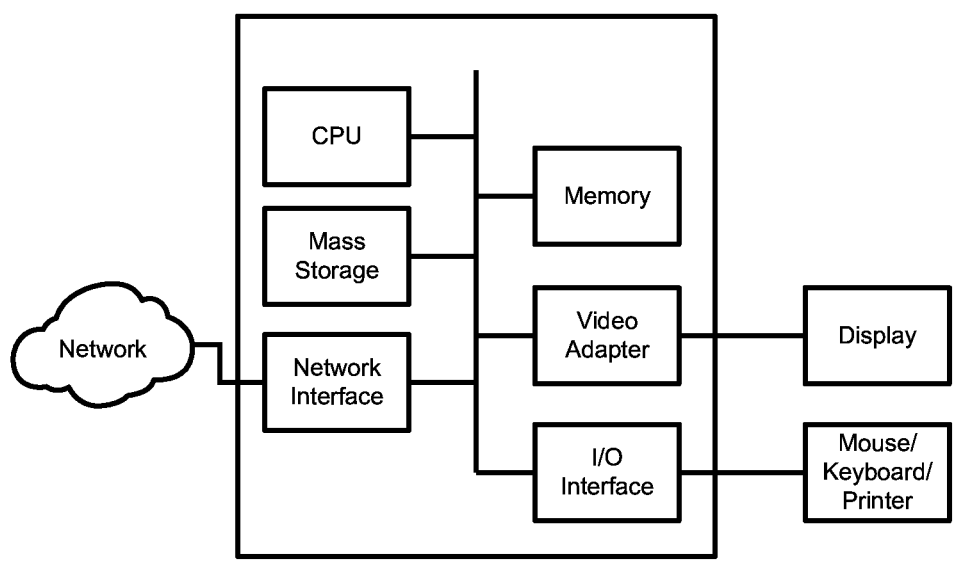
FIG. 11 is a block diagram illustrating a processing system that may be used for implementing the embodiment devices and methods disclosed herein.

FIG. 11 shows a block diagram of a processing system is illustrated that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. In an embodiment, the processing system comprises a computer workstation. The processing system may comprise a processing unit equipped with one or more input/output devices, such as a speaker, microphone, mouse, touchscreen, keypad, keyboard, printer, display, and the like. The processing unit may include a CPU, memory, a mass storage device, a video adapter, and an I/O interface connected to a bus. In an embodiment, multiple processing units in a single processing system or in multiple processing systems may form a distributed processing pool or distributed editing pool.

The bus may be one or more of any type of several bus architectures including a memory bus or memory controller, a peripheral bus, video bus, or the like. The CPU may comprise any type of electronic data processor. The memory may comprise any type of system memory such as random access memory (RAM), static RAM (SRAM), dynamic RAM (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like. The network interface may be configured to have various connection-specific virtual or physical ports communicatively coupled to one or more of these remote devices.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for vehicle messaging comprising:
    obtaining, by a first vehicle, initial trust information comprising a root public key (RPK);
    obtaining, by the first vehicle, a message authentication set comprising a first pool of group certificate (GC) sets and a first vehicle authentication certificate (VAC), wherein the first VAC comprises a first encrypted serial number (ESN) of the first vehicle;
    selecting, by the first vehicle, a first GC set from the first pool, wherein the first GC set comprises a first GC and a first group private key (Gpk);
    determining, by the first vehicle, a first signature in accordance with a first message and a digest function, wherein the first message comprises the first GC;
    sending, by the first vehicle, a first datagram comprising the first message and the first signature;
    receiving, by the first vehicle, a second datagram comprising a second GC and a second signature, wherein the second GC is a duplicate of a GC comprised in the first pool;
    receiving, by the first vehicle, a third datagram comprising a third GC and a third signature, wherein the third GC is not a duplicate of any GC comprised in the first pool;
    verifying the second datagram in accordance with the digest function and a second GPK of the second GC determined according to at least the RPK, wherein the verifying the second datagram comprises:
        determining, by the first vehicle, the second GPK in accordance with a second GPK reconstruction value and the RPK; and
        verifying, by the first vehicle, the second datagram in accordance with the digest function and the second GPK; and
    verifying the third datagram in accordance with the digest function and a third GPK of the third GC determined according to at least the RPK, wherein the verifying the third datagram comprises:
        determining, by the first vehicle, a third GPK in accordance with a third GPK reconstruction value and the RPK; and
        verifying, by the first vehicle, the third datagram in accordance with the digest function and the third GPK.

2. The method of claim 1, wherein
    the first GC comprises a first group public key (GPK) reconstruction value for a first GPK; and
    wherein the first GPK is a matching public key of the first Gpk.

3. The method of claim 2, wherein
    the determining the first signature is further in accordance with the first Gpk;
    the second GC comprises the second GPK reconstruction value; and
    the third GC comprises the third GPK reconstruction value.

4. The method of claim 2, further comprising:
    determining, by the first vehicle in accordance with the first Gpk, a first vehicle dynamic private key (VDpk); and
    determining, by the first vehicle, a first vehicle dynamic public key (VDPK) reconstruction value for a first VDPK that is a matching public key of the first VDpk;
    wherein the first message further comprises the first VDPK reconstruction value;
    wherein the determining the first signature is further in accordance with the first VDpk;
    wherein the second datagram further comprises a second GPK reconstruction value and a second VDPK reconstruction value;
    wherein the verifying the second datagram comprises:
        determining, by the first vehicle, a second GPK in accordance with the second GPK reconstruction value and the RPK;
        determining, by the first vehicle, a second VDPK in accordance with the second VDPK reconstruction value and the second GPK; and
        verifying, by the first vehicle, the second datagram in accordance with the digest function and the second VDPK;
    wherein the third datagram further comprises a third GPK reconstruction value and a third VDPK reconstruction value; and
    wherein the verifying the third datagram comprises:
        determining, by the first vehicle, a third GPK in accordance with the third GPK reconstruction value and the RPK
        determining, by the first vehicle, a third VDPK in accordance with the third VDPK reconstruction value and the third GPK; and
        verifying, by the first vehicle, the third datagram in accordance with the digest function and the third VDPK.

5. The method of claim 1, further comprising
    concatenating the first ESN in accordance with a nonce to produce a concatenated ESN; and encrypting the concatenated ESN in accordance with the RPK and the first Gpk to produce a first double-encrypted serial number (DESN) of the first vehicle;
wherein the first message further comprises the first DESN;
wherein the second datagram further comprises a second DESN of a second vehicle; and
wherein the third datagram further comprises sender data comprising one of a third DESN of a third vehicle and the second DESN.

6. The method of claim 1, further comprising:
determining, by the first vehicle, a vehicle authentication public key (VAPK) that is a matching public key of a vehicle authentication private key (VApk);
encrypting, by the first vehicle, the VAPK in accordance with the RPK to produce an RPK-encrypted VAPK; and
sending, by the first vehicle, a registration request comprising the RPK-encrypted VAPK and a first vehicle serial number (SN) of the first vehicle;
wherein the initial trust information further comprises the VApk and the first SN; and
wherein the obtaining the message authentication set comprises:
receiving, by the first vehicle, a registration package; and
decrypting, by the first vehicle, the registration package in accordance with the VApk to obtain the message authentication set.

7. The method of claim 1, further comprising:
receiving, by the first vehicle, a certificate revocation list (CRL);
determining, by the first vehicle in accordance with the CRL, that a received GC is revoked, wherein the received GC comprises at least one of the second GC and the third GC; and
sending, by the first vehicle, a warning message indicating that the received GC is revoked.

8. A vehicle messaging system comprising:
an on-board equipment (OBE) configured to reside in a first vehicle, the OBE comprising:
a processor; and
a non-transitory computer readable medium;
wherein initial trust information is stored in the non-transitory computer readable medium, the initial trust information comprising a root public key (RPK), and
wherein programming for execution by the processor is stored in the non-transitory computer readable medium, the programming comprising instructions to:
obtain a message authentication set comprising a first pool of group certificate (GC) sets and a first vehicle authentication certificate (VAC), wherein the first VAC comprises a first encrypted serial number (ESN) of the first vehicle;
select a first GC set from the first pool, wherein the first GC set comprises a first GC and a first group private key (Gpk);
determine a first signature in accordance with a first message and a digest function, wherein the first message comprises the first GC;
send a first datagram comprising the first message and the first signature;
receive a second datagram comprising a second GC and a second signature, wherein the second GC is a duplicate of a GC comprised in the first pool;
receive a third datagram comprising a third GC and a third signature, wherein the third GC is not a duplicate of any GC comprised in the first pool;

verify the second datagram in accordance with the digest function and a second GPK of the second GC determined according to at least the RPK, wherein the instructions to verify the second datagram comprise instructions to:
determine the second GPK in accordance with a second GPK reconstruction value and the RPK; and
verify the second datagram in accordance with the digest function and the second GPK; and
verify the third datagram in accordance with the digest function and a third GPK of the third GC determined according to at least the RPK, wherein the instructions to verify the third datagram comprise instructions to:
determine the third GPK in accordance with a third GPK reconstruction value and the RPK; and
verify the third datagram in accordance with the digest function and the third GPK.

9. The system of claim 8, wherein
the first GC comprises a first group public key (GPK) reconstruction value for a first GPK; and
the first GPK is a matching public key of the first Gpk.

10. The system of claim 9,
wherein the instructions to determine the first signature comprise instructions to determine the first signature in accordance with the first message, the digest function, and the first Gpk;
wherein the second GC comprises the second GPK reconstruction value; and
wherein the third GC comprises the third GPK reconstruction value.

11. The system of claim 9,
wherein the programming further comprises instructions to:
determine, by the first vehicle in accordance with the first Gpk, a first vehicle dynamic private key (VDpk); and
determine, by the first vehicle, a first vehicle dynamic public key (VDPK) reconstruction value for a first VDPK that is a matching public key of the first VDpk;
wherein the first message further comprises the first VDPK reconstruction value;
wherein the instructions to determine the first signature comprise instructions to determine the first signature in accordance with the first message, the digest function, and the first VDpk;
wherein the second datagram further comprises a second GPK reconstruction value and a second VDPK reconstruction value;
wherein the instructions to verify the second datagram comprise instructions to:
determine a second GPK in accordance with the second GPK reconstruction value and the RPK;
determine a second VDPK in accordance with the second VDPK reconstruction value and the second GPK; and
verify the second datagram in accordance with the digest function and the second VDPK;
wherein the third datagram further comprises a third GPK reconstruction value and a third VDPK reconstruction value; and
wherein the instructions to verify the third datagram comprise instructions to:
determine a third GPK in accordance with the third GPK reconstruction value and the RPK;

determine a third VDPK in accordance with the third VDPK reconstruction value and the third GPK; and
verify the third datagram in accordance with the digest function and the third VDPK.

12. The system of claim 8, wherein
the programming further comprises instructions to:
concatenate the first ESN in accordance with a nonce to produce a concatenated ESN; and
encrypt the concatenated ESN in accordance with the RPK and the first Gpk to produce a first double-encrypted serial number (DESN) of the first vehicle;
the first message further comprises the first DESN;
the second datagram further comprises a second DESN of a second vehicle; and
the third datagram further comprises sender data comprising one of a third DESN of a third vehicle and the second DESN.

13. The system of claim 8,
wherein the programming further comprises instructions to:
determine a vehicle authentication public key (VAPK) that is a matching public key of a vehicle authentication private key (VApk);
encrypt the VAPK in accordance with the RPK to produce an RPK-encrypted VAPK; and
send a registration request comprising the RPK-encrypted VAPK and a first vehicle serial number (SN) of the first vehicle;
wherein the initial trust information further comprises the VApk and the first SN; and
wherein the instructions to obtain the message authentication set comprise instructions to:
receive a registration package; and
decrypt the registration package in accordance with the VApk to obtain the message authentication set.

14. The system of claim 8, wherein the programming further comprises instructions to:
receive a certificate revocation list (CRL);
determine in accordance with the CRL that a received GC is revoked, wherein the received GC comprises at least one of the second GC and the third GC; and
send a warning message indicating that the received GC is revoked.

15. A cryptographic support system comprising:
a registration authority (RA) node comprising at least one RA processor, an RA network interface, and an RA storage set;
wherein the RA network interface comprises an upstream RA port and a downstream RA port; and
wherein the RA storage set comprises at least one non-transitory computer readable medium storing RA programming for execution by the at least one RA processor, the RA programming comprising instructions to:
send, at the upstream RA port, a first anonymous registration request comprising a first encrypted serial number (ESN) associated with a first vehicle and an encrypted first vehicle authentication public key (VAPK) associated with the first vehicle;
receive, at the upstream RA port, a first registration package comprising:
an encrypted first pool of group certificates (GCs) that is encrypted in accordance with the first VAPK, wherein the first pool comprises a first GC;
send, at the upstream RA port, a second anonymous registration request comprising a second ESN associated with a second vehicle different from the first vehicle and an encrypted second VAPK associated with the second vehicle;
receive, at the upstream RA port, a second registration package comprising:
an encrypted second pool of GCs that is encrypted in accordance with the second VAPK, wherein the second pool comprises:
the first GC; and
a second GC that is not comprised in the first pool;
receive, at the downstream RA port, a first registration request comprising a first vehicle serial number (SN) and the encrypted first VAPK;
encrypt the first vehicle SN, in accordance with an RA key stored in the RA storage set, to produce the first ESN; and
send, at the upstream RA port, the first registration package, wherein the first registration package further comprises an encrypted first vehicle authentication certificate (VAC) that is encrypted in accordance with the first VAPK.

16. The system of claim 15,
wherein the RA network interface further comprises a downstream RA port; and
wherein the RA programming further comprises instructions to:
receive, at the downstream RA port, a revocation request comprising a first vehicle serial number (SN);
encrypt the first vehicle SN, in accordance with an RA key stored in the RA storage set, to produce the first ESN;
send, at the upstream RA port, an anonymous revocation request comprising the first ESN;
receive, at the upstream RA port, a certificate revocation list (CRL); and
send, at the downstream RA port, the CRL.

17. The system of claim 15,
wherein the RA network interface further comprises at least one downstream RA port; and
wherein the RA programming further comprises instructions to:
receive, at the at least one downstream RA port, a threat revocation request comprising a double-encrypted serial number (DESN);
send, at the upstream RA port, a decryption-revocation request comprising the DESN;
receive, at the upstream RA port, a third ESN;
receive, at the upstream RA port, a certificate revocation list (CRL);
decrypt the third ESN, in accordance with an RA key stored in the RA storage set, to produce a third vehicle SN; and
send the CRL at the at least one downstream RA port in accordance with the third vehicle SN.

18. The system of claim 15 further comprising:
a certificate authority (CA) node comprising at least one CA processor, a CA network interface, and a CA storage set;
wherein the CA network interface comprises a downstream CA port and an upstream CA port;
wherein the downstream CA port is in communication with the upstream RA port; and
wherein the CA storage set comprises at least one non-transitory computer readable medium storing CA programming for execution by the at least one CA processor, the CA programming comprising instructions to:

receive, at the downstream CA port, the first anonymous registration request;

send, at the upstream CA port, a VAC request comprising the anonymous registration request;

receive, at the upstream CA port, the first VAPK and the encrypted first VAC;

select, in accordance with a pseudo-random selection algorithm, the first pool of GCs from a global pool of GCs stored in the CA storage set, wherein each GC in the first pool comprises a respective GC identifier; and store, in the CA storage set, a GC mapping comprising the GC identifiers of the first pool and the first ESN;

encrypt the first pool in accordance with the VAPK to produce the encrypted first pool; and send, at the downstream CA port, the registration package.

19. The system of claim 18, wherein the CA programming further comprises instructions to:

generate a first batch of unsigned GCs;

send, at the upstream port, a GC signing request comprising the first batch;

receive, at the upstream port, a second batch comprising signed versions of the unsigned GCs of the first batch; and store the second batch in the CA storage set to augment the global pool of GCs.

20. The system of claim 18, wherein the CA programming further comprises instructions to:

obtain an anonymous revocation request comprising the first ESN;

retrieve from the CA storage set a first revocation set representing GC identifiers mapped to the first ESN;

revoke from the global pool of GCs, for each respective GC identifier represented in the first revocation set, a respective GC comprising the respective GC identifier; and determine a certificate revocation list (CRL) indicating that each GC identifier represented by the first revocation set is revoked.

21. The system of claim 20, wherein the instructions to obtain the anonymous revocation request comprise instructions to:

receive, at the downstream port, a threat revocation request comprising a double-encrypted SN (DESN);

send, at the upstream port, a decryption request comprising the DESN; and receive, at the upstream port, the first ESN.

22. The method of claim 7, wherein:

the received GC further comprises a first certificate serial number (SN) that is not greater than a maximum allowable certificate SN;

the CRL is sent by a revocation station;

the CRL comprises a bit vector having a first size in bits;

the first size is equal to the maximum allowable certificate SN; and each bit in the bit vector has a respective position number and a respective bit value indicating a revocation status of a respective signed certificate having a certificate SN equal to the respective position number such that the respective signed certificate is revoked when the respective bit value is a first value and is not revoked when the respective bit value is a second value.

23. The method of claim 22, wherein the obtaining the CRL comprises:

receiving, by the first vehicle, a compressed file sent by the revocation station; and decompressing, by the first vehicle, the compressed file to obtain the CRL.

24. The method of claim 23, wherein the revocation station comprises at least one of a stationary unit covering a travel path of the first vehicle, or a second vehicle.

* * * * *